United States Patent [19]

Fa

[11] Patent Number: 5,192,043

[45] Date of Patent: Mar. 9, 1993

[54] MAGNETIC RUBBER SUCTION DISC

[76] Inventor: Yen C. Fa, 5F, No. 10, Lane 560, Chung Cheng Rd., Hsinten, Taipei Hsien, Taiwan

[21] Appl. No.: 805,056

[22] Filed: Dec. 11, 1991

[51] Int. Cl.⁵ .............................................. A47G 29/00
[52] U.S. Cl. .............................. 248/206.2; 248/206.5; 248/363
[58] Field of Search .................. 248/205.2–206.5, 248/205.5, 467, 362, 363

[56] References Cited

U.S. PATENT DOCUMENTS

| | | | |
|---|---|---|---|
| 1,877,570 | 9/1932 | Gerald | 248/362 X |
| 2,590,410 | 3/1952 | Hurley | 248/206.3 |
| 2,936,139 | 5/1960 | Lindstrom | 248/362 X |
| 3,863,568 | 2/1975 | Frederick | 248/362 X |
| 4,666,114 | 5/1987 | Kroczynski et al. | 248/363 X |
| 4,674,949 | 6/1987 | Kroczynski | 248/363 X |
| 5,065,973 | 11/1991 | Wang | 248/362 |
| 5,087,005 | 2/1992 | Holoff et al. | 248/363 X |

Primary Examiner—Karen J. Chotkowski
Attorney, Agent, or Firm—Morton J. Rosenberg; David I. Klein

[57] ABSTRACT

A magnetic rubber suction disc for detachably securing an alarming device to a metal surface, comprising a rubber seat having a raised portion at the top for holding an alarming device, and a suction disc made from a magnetic rubber and attached to the rubber seat at the bottom. The suction disc has a raised portion defining a vacuum formation zone which, when the suction disc is attached to a metal surface, forms a vacuum chamber to produce a suction effect.

1 Claim, 2 Drawing Sheets

MAGNETIC RUBBER SUCTION DISC

BACKGROUND OF THE INVENTION

The present invention relates to suction discs and relates more particularly to a magnetic rubber suction disc for detachably securing an alarming device to a metal surface.

A movable alarming device may have a magnetic iron fastened in the bottom edge of the casing thereof so that it can be conveniently attached to the metal plate of the body of a motor vehicle. The coating on a motor vehicle's body may be scrapped off by the magnetic iron of a movable alarming device easily during the process of mounting or dismounting. Further, a movable alarming device of the said type may be caused to drop from a metal surface by a vibrating force or strong wind force.

SUMMARY OF THE INVENTION

The present invention has been accomplished to eliminate the aforesaid disadvantages. It is therefore the main object of the present invention to provide a magnetic rubber suction disc for securing an alarming device to a metal surface by means of magnetic force and suction effect. The present invention utilizes a suction disc made from a magnetic rubber and attached to a rubber seat which has a raised portion at the middle for holding an alarming device at the top. When the suction disc is attached to a metal surface by means of the effect of magnetic force, a vacuum is formed in side a raised portion on the suction disc to produce a suction effect for securing the suction disc to the metal surface more tightly.

DETAILED DESCRIPTION OF THE PREFERRED EMBODIMENTS

Figure 1:
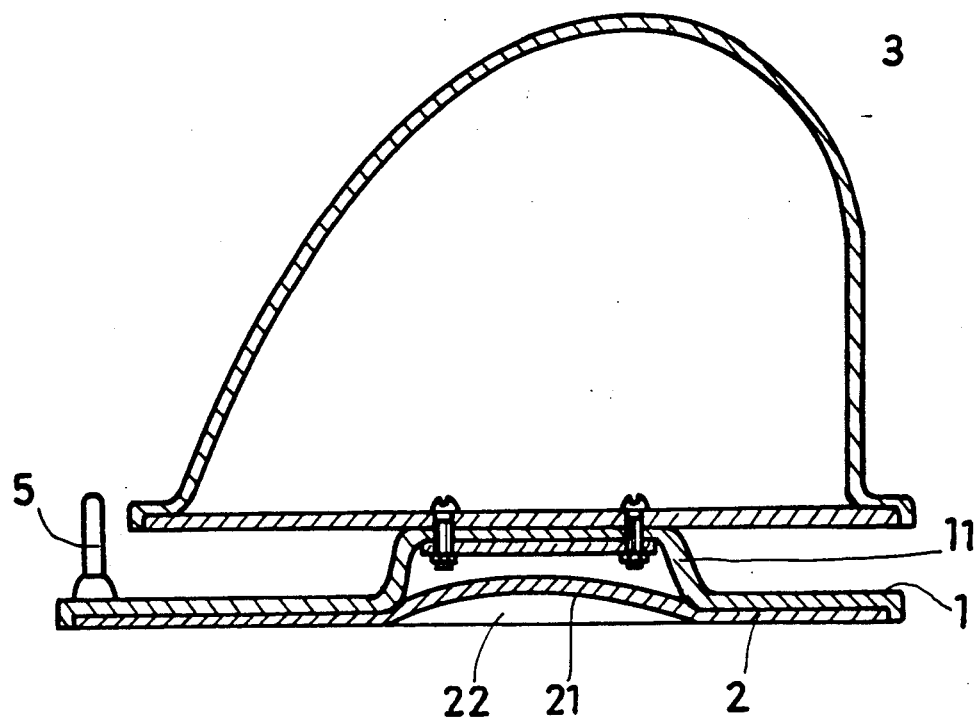
FIG. 1 is a side sectional view of a movable alarming device as constructed according to the present invention, in which an alarm lamp is secured to a magnetic rubber suction disc of the present invention.
Figure 2:
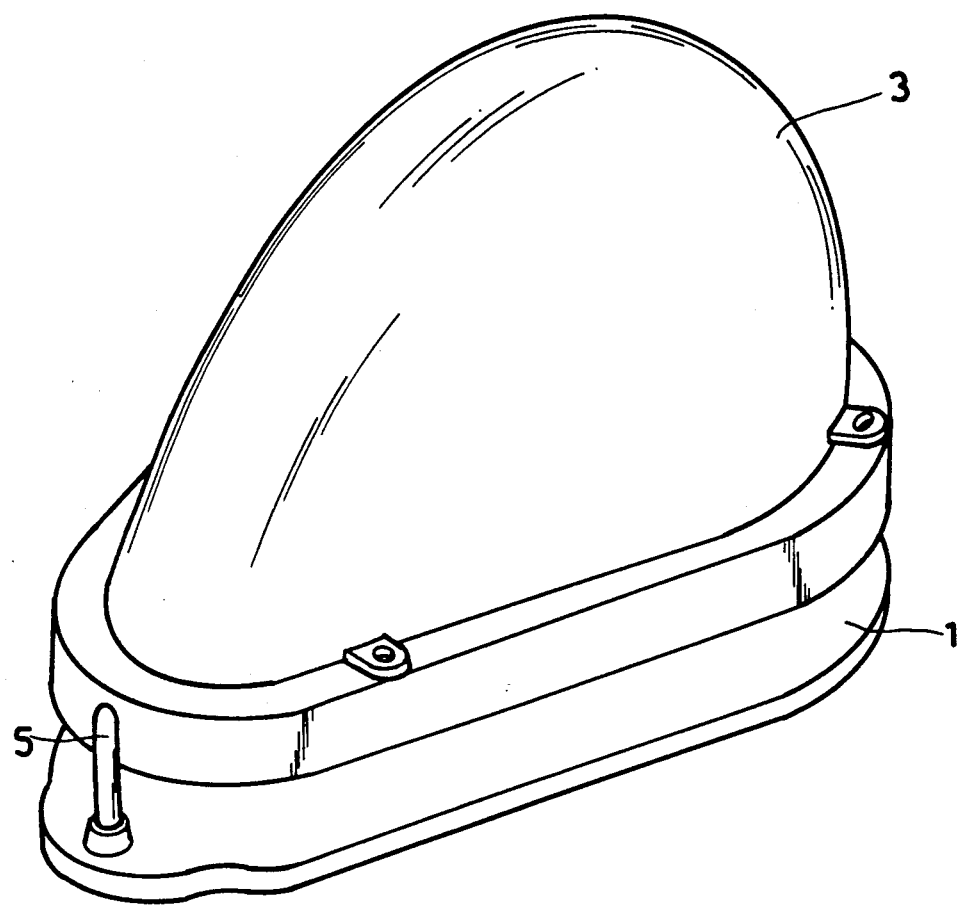
FIG. 2 is an elevational view thereof.

Referring to FIGS. 1 and 2, therein illustrated is a movable alarming device embodying the present invention which is generally comprised of a rubber seat 1, a suction disc 2, and an alarm lamp 3. The rubber seat 1 has a raised portion 11 at the middle for holding the alarm lamp 3. The alarm lamp 3 can be fastened in the raised portion 11 of the rubber seat 1 by screws or any of a variety of fastening means. The suction disc 2 is made from a magnetic rubber having a raised portion 21 at the middle defining a vacuum zone 22 therein. During assembly process, the suction disc 2 is tightly attached to the rubber seat 1 at the bottom with the raised portion 21 thereof disposed beneath the raised portion 11 of the rubber seat 1, then, the alarm lamp 3 is secured to the raised portion 11 of the rubber seat 1 at the top. When the movable alarming device is attached to a metal surface, the suction disc 2 becomes firmly secured in place by means of the effect of the magnetic force and the effect of suction formed in the vacuum zone 22. Because the connecting area between the alarm lamp 3 and the rubber seat 1 is confined within the raised portion 11 which suspended from the metal surface onto which the movable alarming device is mounted, any external force applied at the alarm lamp 3 will cause the raised portion 11 to vibrate so as to absorb or eliminate the vibrating waves from the alarm lamp 3. Further, there is a lever 5 fastened in the rubber seat adjacent to the peripheral edge thereof. By pulling the lever 5, the movable alarming device can be conveniently detached from a metal surface.

Figure 3:
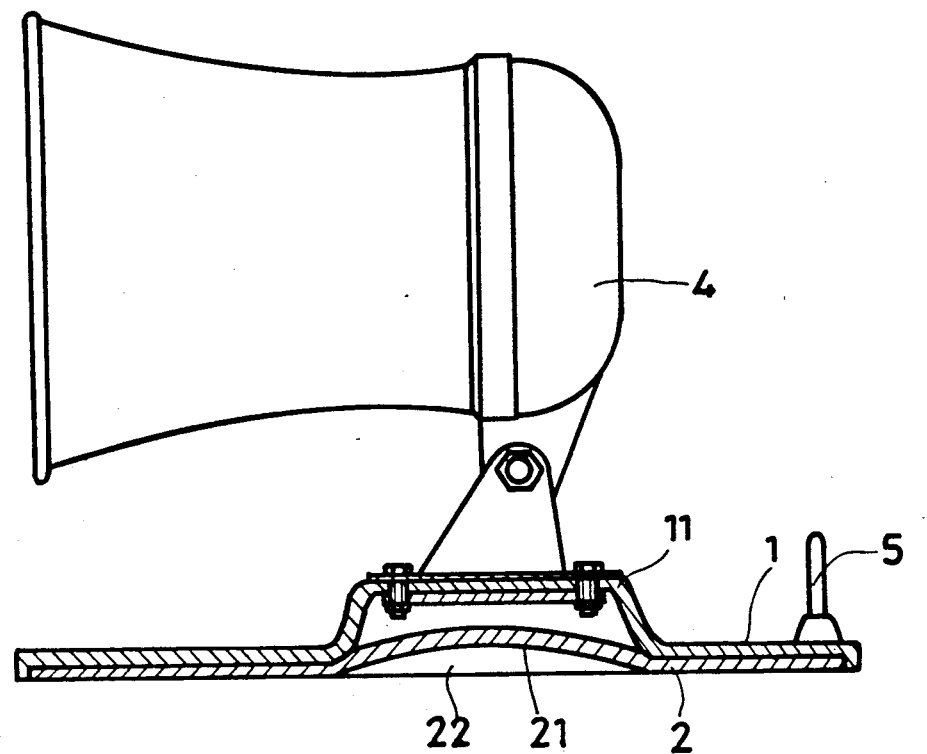
FIG. 3 is a side sectional view of another movable alarming device as constructed according to the present invention, in which an audio alarm is secured to a magnetic rubber suction disc of the present invention. embodiment according to the present invention.

Referring to FIG. 3, therein illustrated is an alternate form of the present invention. In this embodiment, an audio alarm 4 is fastened in a raised portion at the middle of a rubber seat above a suction disc. Because the structures of the rubber seat and the suction disc remain unchanged, same numerals are used for designation.

What is claimed is:

1. A magnetic rubber suction disc assembly for releasably securing an alarming device to a metal surface by both suction and magnetic attraction, comprising:

a suction disc member formed of a magnetic rubber composition, said suction disc member having a peripheral portion and a centrally disposed first raised portion, said first raised portion defining a vacuum formation zone; and a seat member coupled to said peripheral portion of said suction disc member, said seat member having a centrally disposed second raised portion for coupling to said alarming device, said second raised portion being located in overlying relation with respect to said first portion, said first and second raised portions being spaced each from the other in detached relation therewith, whereby said second raised portion of said seat member substantially isolates said first raised portion from vibration of said alarming device.

* * * * *